(12) United States Patent
Benisty et al.

(10) Patent No.: US 12,717,502 B2
(45) Date of Patent: Aug. 25, 2026

(54) SELF-TRACKING DYNAMIC ALLOCATION OF FREE CHUNKS AT L2P IN THIN PROVISIONING

(71) Applicant: Sandisk Technologies, Inc., Milpitas, CA (US)

(72) Inventors: Shay Benisty, Beer Sheva (IL); Ariel Navon, Revava (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/919,573

(22) Filed: Oct. 18, 2024

(65) Prior Publication Data

US 2026/0111130 A1 Apr. 23, 2026

(51) Int. Cl.
*G06F 3/06* (2006.01)

(52) U.S. Cl.
CPC ............ *G06F 3/0631* (2013.01); *G06F 3/061* (2013.01); *G06F 3/067* (2013.01)

(58) Field of Classification Search
None
See application file for complete search history.

(56) References Cited

U.S. PATENT DOCUMENTS 9,436,399 B2 9/2016 Garson et al.
9,606,914 B2 3/2017 Thatcher et al.
9,807,170 B2 10/2017 Kaneko et al.
10,521,131 B2 12/2019 Yamamoto
11,340,810 B2 5/2022 Navon et al.
11,650,917 B2 5/2023 Brandt
11,650,920 B1 5/2023 Shatsky et al.
11,663,136 B2 5/2023 Xie et al.
2015/0095555 A1 4/2015 Asnaashari et al.
2017/0351452 A1* 12/2017 Boyd .................... G06F 3/0611
2023/0143926 A1 5/2023 Inbar et al.

OTHER PUBLICATIONS

N-able, "Thin Provisioning Explained", Aug. 12, 2019.
Navon et al., U.S. Appl. No. 18/811,536, filed Aug. 21, 2024.
Benisty et al., U.S. Appl. No. 18/582,483, filed Feb. 20, 2024.

* cited by examiner

*Primary Examiner* — Brian R Peugh
(74) *Attorney, Agent, or Firm* — Patterson + Sheridan, LLP

(57) ABSTRACT

System performance can be optimized by dynamically allocating temporary buffers. Once the temporary buffers are initially allocated, the system performance is measured. Based upon the measurements, a determination is made regarding whether the temporary buffers should be reallocated to improve performance. If performance will improve, then the reallocation occurs. After the reallocation, performance is again measured and, if necessary, another reallocation may occur. Measuring the performance and reallocating the temporary buffers will continue to dynamically occur in the pursuit of optimal performance.

17 Claims, 5 Drawing Sheets

SELF-TRACKING DYNAMIC ALLOCATION OF FREE CHUNKS AT L2P IN THIN PROVISIONING

BACKGROUND OF THE DISCLOSURE

Field of the Disclosure

Embodiments of the present disclosure generally relate to improved thin provisioning.

Description of the Related Art

Thick and thin provisioning represent the two rival ways to allocate storage space in centralized disk storage systems, storage area networks (SANs), and storage virtualization systems.

Thick provisioning, also known as fat provisioning, is the more conventional method. Using thick provisioning, storage space on physical media is allocated to particular users (e.g., host devices, clients, or client devices) when their drive partition is created. A set amount of storage resources are reserved for each user, regardless of how much space they are actually using. As an example, consider an office with multiple users who each need up to 50 GB of network storage where the office has a 100 GB hard drive on the network. With thick provisioning, only two users could fit on the drive. Even if one user was merely using 10 GB of space, the user would still occupy half of the capacity of the drive.

Thick provisioning allocates storage space up front in anticipation of future needs, which can cause inefficiency and wasted space. If users only fill up a small portion of their quota, the rest of the space on the drive remains unused. The business must pay to maintain this excess hard drive or solid state capacity, which takes up physical space, uses energy, and generates heat. On the other hand, the advantage of this pre-allocated space is that it guarantees there will be enough capacity available. The network will not run out of space even if both users approach their complete 50 GB quota. Moreover, thick provisioning causes no delay and no overhead in maneuvering shared physical storage space between several users.

Thin provisioning, also known as virtual provisioning or thin storage, is the rival disk provisioning method. Thin provisioning allocates disk space to users on demand based on how much space users need at any given time. As a user writes more data to the disk, the user will take up more of the physical capacity of the disk; when the user deletes data, the user's portion shrinks. Divisions on physical storage are virtual and flexible rather than determined in advance.

Following the previous example, in a thin provision system, each user would only take up the amount of disk space the user is actually using. If the two users have each saved 10 GB of data into the disk (totaling 20 GB), 80 GB would remain free on the disk for other users. Therefore, the 100 GB drive can easily accommodate three or more users, each believing they have access to 50 GB of space. Essentially, the system claims to have more physical resources than are actually available. This is called "overprovisioning."

A logical to physical (L2P) table is implemented in SSD to hold the L2P address translation. The L2P table is commonly used in SSDs to support the nature of the flash memory technology. When the thin provisioning method is supported, the size of the L2P table is larger because the logical memory space is larger compared to the thick provisioning method.

The straightforward approach to support the thin provisioning method is to increase the size of the L2P table. In such an approach, the storage allocated for L2P tables is fully allocated to this purpose and not shared based on L2P utilization. It is possible to support thin provisioning without increasing dynamic random access memory (DRAM) by using hash functions while adding more constraints and complexity to the system.

It should be noted that in implementing the thin provisioning mode, the allocated L2P table should support the accumulated full logical address range as seen by all users. For example, in the running example mentioned above, for an office with multiple (e.g., 10) users who each needs up to 50 GB of network storage, the L2P table should cover a storage address space of 500 GB. However, as usually each user is typically using no more than 10 GB, the allocated L2P table will be mostly "empty". Stated another way, the L2P table will include mostly unused "holes" (which is a waste of expensive resource of DRAM).

Therefore, there is a need in the art for improved thin provisioning.

SUMMARY OF THE DISCLOSURE

System performance can be optimized by dynamically allocating temporary buffers. Once the temporary buffers are initially allocated, the system performance is measured. Based upon the measurements, a determination is made regarding whether the temporary buffers should be reallocated to improve performance. If performance will improve, then the reallocation occurs. After the reallocation, performance is again measured and, if necessary, another reallocation may occur. Measuring the performance and reallocating the temporary buffers will continue to dynamically occur in the pursuit of optimal performance.

In one embodiment, a data storage device comprises: a memory device; and a controller coupled to the memory device, wherein the controller is configured to: receive a write command; track and update performance values for each host device of a plurality of host devices in a table; determine whether to change buffer allocation for any host device of the plurality of host devices; and update the table tracking performance values.

In another embodiment, a data storage device comprises: a memory device; and a controller coupled to the memory device, wherein the controller is configured to: track performance of multiple host devices; allocate temporary buffers to the multiple host devices; determine performance for one or more host devices of the multiple host device would improve with a different allocation of temporary buffers; and reallocate temporary buffers based upon the determination.

In another embodiment, a data storage device comprises: means to store data; and a controller coupled to the means to store data, wherein the controller is configured to: allocate one or more temporary buffers for processing commands of a first priority; determine whether the allocating achieves a predetermined desired performance; and change the allocation of the one or more temporary buffers.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

System performance can be optimized by dynamically allocating temporary buffers. Once the temporary buffers are initially allocated, the system performance is measured. Based upon the measurements, a determination is made regarding whether the temporary buffers should be reallocated to improve performance. If performance will improve, then the reallocation occurs. After the reallocation, performance is again measured and, if necessary, another reallocation may occur. Measuring the performance and reallocating the temporary buffers will continue to dynamically occur in the pursuit of optimal performance.

Figure 1:
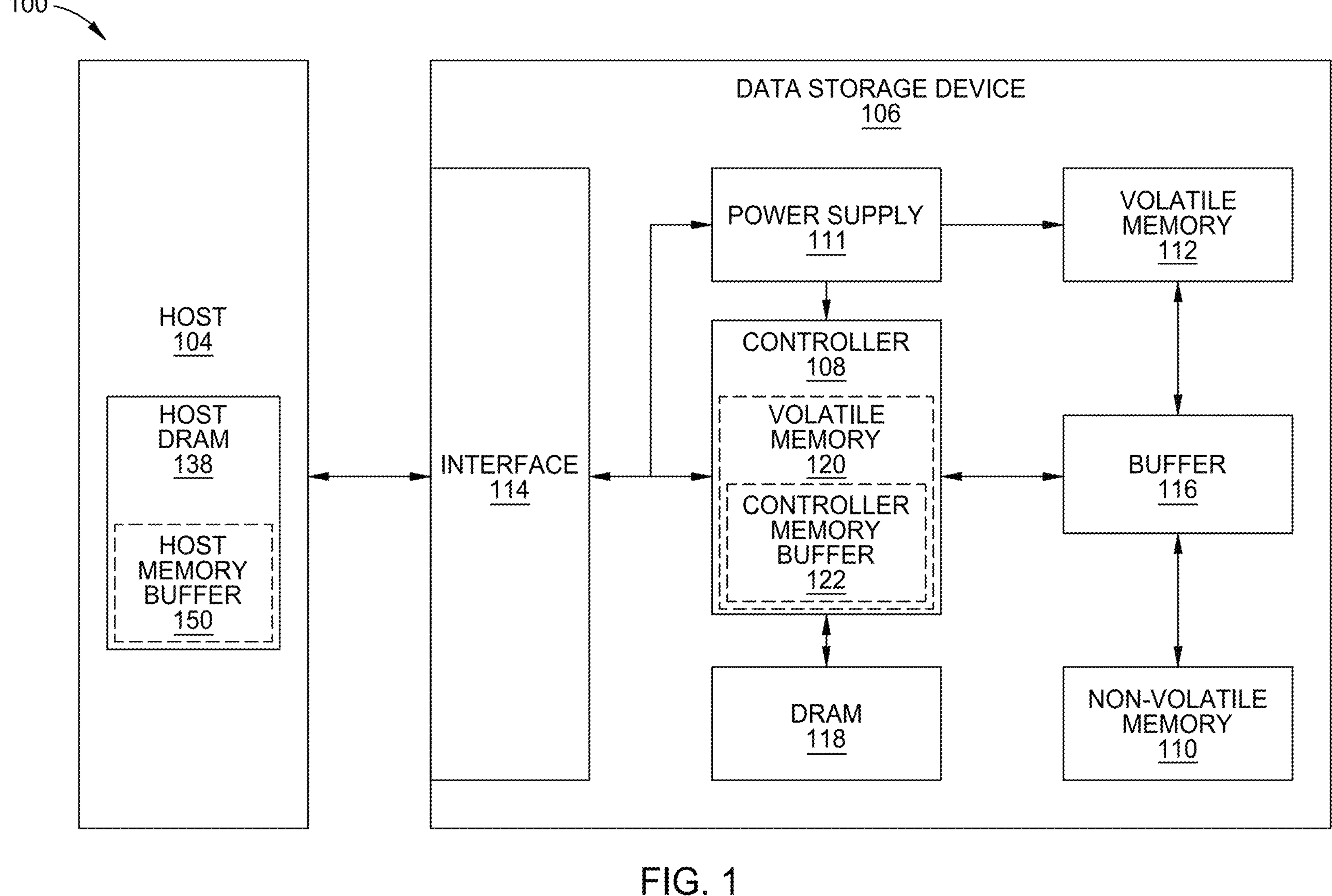
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110. Controller 108 may include circuitry or processors configured to execute programs for operating the data storage device 106.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
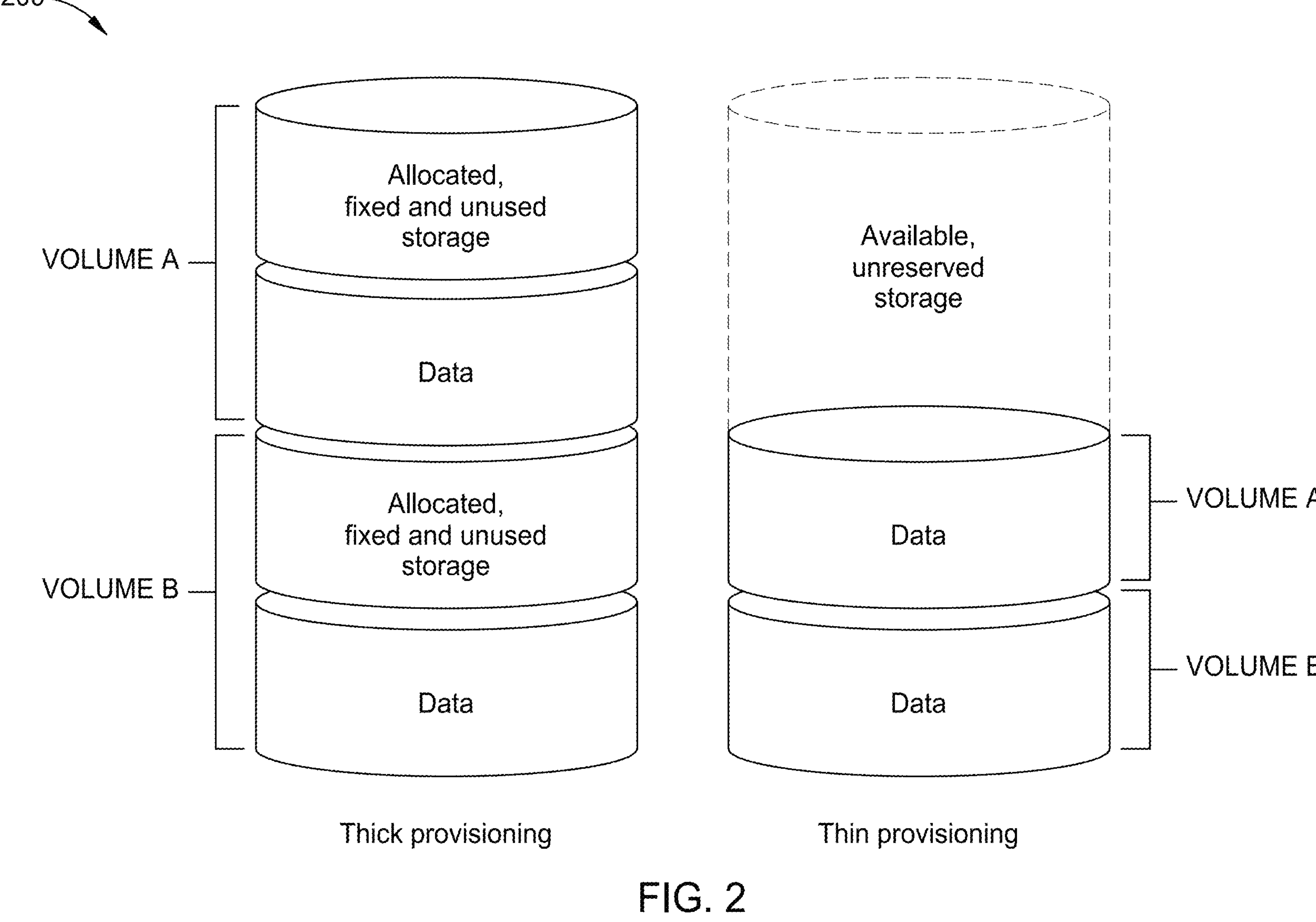
FIG. 2 is a schematic illustration of thick provisioning and thin provisioning.

FIG. 2 is a schematic illustration 200 of thick provisioning and thin provisioning and depicts the L2P management used in a thin provisioning method. In FIG. 2, it is shown that for thick provisioning, two volumes are allocated, Volume A and Volume B. However, for both Volume A and Volume B, there is some data, but also a non-negligible unused storage. The unused storage is allocated and cannot be reallocated. When the memory is allocated in thick provisioning, usually at initialization, the allocated amount of memory is fixed. If Volume A is allocated to User A and Volume B is allocated to User B, Users A and B can do whatever is desired for the allocated memory. Even if User A, for example, uses only ten percent of the allocated memory, all of the rest would be still allocated to User A and thus the unused storage would not be usable by any other user. Hence, in the thick provisioning shown in FIG. 2, there is a large waste of storage.

In thin provisioning, the allocating is not done at initialization, but rather, occurs just before usage. In the thin provisioning illustration in FIG. 2, Volume A and Volume B are only the size that meets the current needs of User A and User B. The unused storage is allocated for a free pool and whenever a User A or User B needs to write more data to the memory device, more memory can be allocated to User A or User B.

Another difference between thick and thin provisioning methods is the ability for a thin provisioning method to use disk space more efficiently than a thick provisioning method. Thin provisioning enables the squeezing of more users onto a particular volume of physical storage while avoiding additional costs relating to excessive capacity (e.g., unused disk space). Network administrators are then freed up from maintaining vast amounts of unused disk space. In turn, this reduces costs relating to the purchasing of storage, time spent maintaining the storage, and energy to run the storage. With less hardware, a thin-provisioned storage solution will take up less physical space and offer a more efficient solution over previous methods. Thus, implementing a thin provisioning method can reduce operation costs and improve the optimization of data storage devices.

Expanding upon the example for thin provisioning, if the total memory device capacity is 100 GB and there are two users, User A and User B, then at the beginning of life (i.e., initialization phase) for the memory device, 100 GB is advertised to both User A and User B. Thus, 200 GB in total is advertised even though the physical capacity is only 100 GB. However, each user (i.e., User A and User B) is told that the 100 GB capacity is allocated for them. Users A and B will then start using the memory device and the benefit of having 100 GB available. Even if User A is provisioned only 1 GB due to actual usage, the management table (i.e., L2P table) will need to be sized to handle 100 GB. Because both User A and User B are advertised 100 GB each (even though in actuality there is only 100 GB in total, not 200 GB in total), the L2P table will need to be double in size. Generally, a L2P table is implemented in SSD to hold the L2P address translation and support the nature of the flash memory technology. When the thin provisioning method is supported, the size of the L2P table is larger because the logical memory space is larger compared to the thick provisioning method. Because each user will typically not utilize the full amount of storage available, the allocated L2P table will be mostly "empty". Stated another way, the L2P table will include mostly unused "gaps" (which is a waste of an expensive resource of DRAM).

Previous methods of thin provisioning have utilized the gaps in the L2P table for system temporal or temp or temporary buffers. Effective utilization of the allocated RAM resources could be achieved, even while working with thin provisioning L2P resources sharing mode. A modified dynamic clustering method could also be considered with the ability to prioritize soft-congestion of the free address chunks or "gaps" and to prioritize stable free chunk allocation. Utilizing the holes at the extended L2P table for system temporal buffers supports thin provisioning L2P resource sharing mode, and the usage of the empty regions (e.g., "holes" or "gaps") at the L2P as temporal buffers allows better utilization of the allocated RAM resources for ongoing system performance, where still being able to support flexible thin-provisioning resource sharing.

However, such methods do not incorporate on-line supervision of overall system performance, and accordingly to optimize the L2P temp-buffers allocation to different system elements. As a result, both options that describe the usage of the extended L2P table at temp-buffers suffer from sub-optimal usage, in the perspective of improved performance of the storage memory system. Such concepts still suffer from suboptimal allocation of the temporal buffers to the different virtual host devices and different system elements, and therefore degraded system performance. The approach of allocating the L2P originated temporal buffers is based on fixed/equal division of the free spaces at the L2P between the hosts/system-elements.

In contrary, as discussed herein, a dynamic allocation of L2P temporal buffers is disclosed, which is based on continuous tracking and adaptive tuning of the allocated L2P buffers to different hosts/system elements, such that the L2P resources utilization is optimized.

As discussed herein, a self-tracking adaptive allocation of L2P temp-buffers, as to provide an optimized thin provisioning shared resources storage memory system is disclosed. The proposed mechanism will track the overall system performance (including power consumption, read/write timings etc.), as well as the performance values per virtual host device and/or per main system element (i.e., physical function, endurance group, etc.); and will dynamically modify the L2P temp-buffers allocation accordingly.

Figure 3:
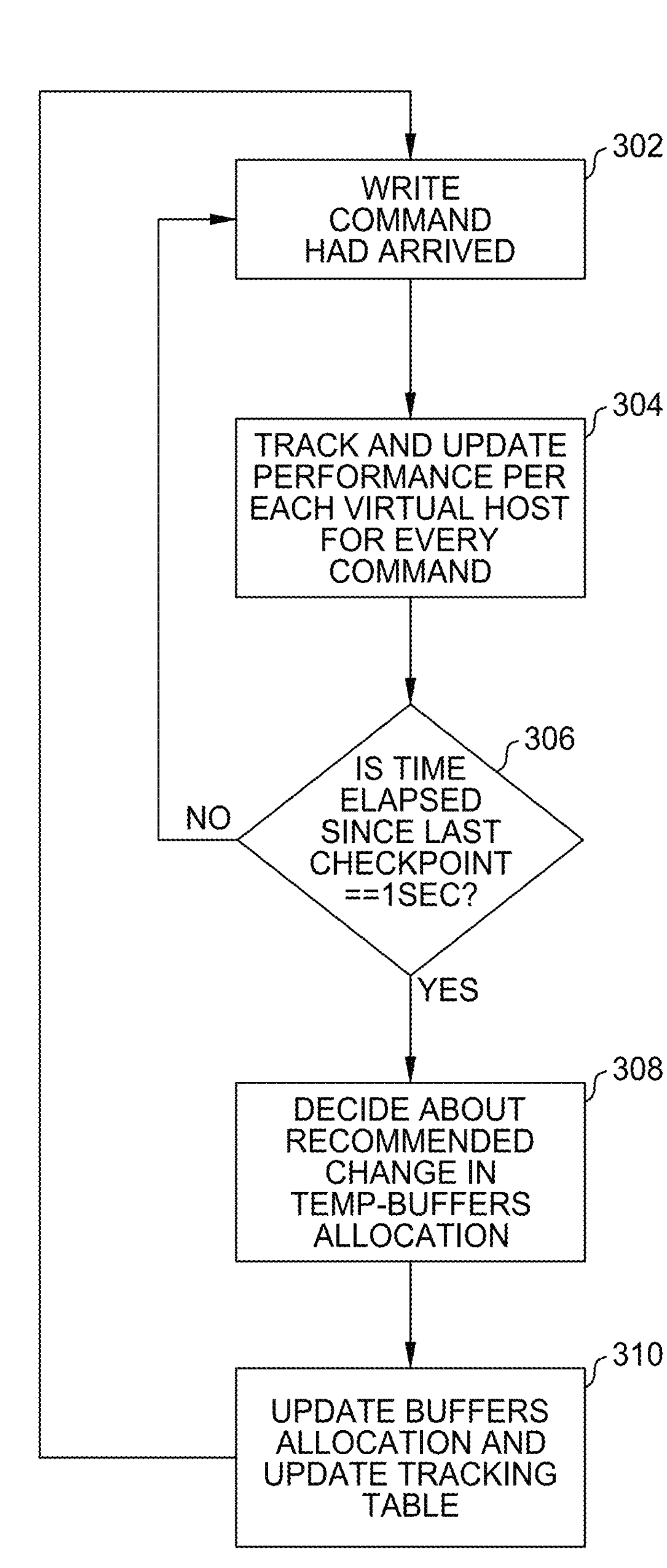
FIG. 3 is a flowchart illustrating adaptive tuning according to one embodiment.

A first simplified embodiment is to allocate more temporary buffers to virtual host devices and/or system elements that previous added such buffers had demonstrated significant performance improvement, such as on the expense of other host devices/system-elements that had proven no-performance change in later supplemental of such temporary buffers. FIG. 3 illustrates an example of the embodiment. FIG. 3 illustrates a flowchart 300 of adaptive tuning according to one embodiment.

Generally speaking, the embodiment involves measuring to determine the gain for how the temporary buffers are allocated. Specifically, determining the gain per host device. The determination will occur from time to time, such as in one second intervals. If the gain was not sufficient, then the allocation of resources or the holes occurs in order to maximize the performance. It is to be understood that one second is merely an example and other predetermined intervals are also contemplated.

It is to be noted that performance is just one example. In general, the gain could be to maximize performance, power usage, quality of service (QoS), latency, or some other measurement criteria. Whenever receiving a write command, track the criteria and update the criteria for each virtual host device for every command received.

TABLE I

| # Virtual Host | Change in allocated temp-buffers | Previous (averaged) performance per virtual host | Updated (averaged) performance per virtual host |
|---|---|---|---|
| 0 | 3 | 100 MB/sec | 110 MB/sec |
| 1 | −3 | 90 MB/sec | 91 MB/sec |

TABLE I-continued

| # Virtual Host | Change in allocated temp-buffers | Previous (averaged) performance per virtual host | Updated (averaged) performance per virtual host |
|---|---|---|---|
| 2 | 10 | 120 MB/sec | 121 MB/sec |
| 3 | −10 | 140 MB/sec | 110 MB/sec |

TABLE II

| # Virtual Host | Change in allocated temp-buffers | Previous (averaged) performance per virtual host | Updated (averaged) performance per virtual host |
|---|---|---|---|
| 0 | 5 | 110 MB/sec | — |
| 1 | −5 | 91 MB/sec | — |
| 2 | −10 | 121 MB/sec | — |
| 3 | 10 | 110 MB/sec | — |

Tables I and II illustrate performance changes versus buffer allocation at various points in time for an embodiment. It is to be noted that the "(averaged) performance" is a tracked performance that can be, for example, write performance.

In specific regards to FIG. 3, a write command has arrived at block 302 and the controller tracks and updates performance per each virtual host for every command at block 304. The tracked performance is shown in Table I. Thereafter, a determination is made at block 306 regarding whether the time elapsed since the last checkpoint has occurred. As an example, the time elapsed may be predetermined and may be set to one second. If the time has not elapsed, then the process returns to block 302, but if the time has elapsed, the controller decides about recommended changes to make in the temp-buffer allocation at block 308 based upon the "Updated (averaged) performance" shown in Table I. Thereafter, the buffer allocation is updated as is the tracking table in block 310 which results in Table II after the updates and circles back to block 302 so that the process can repeat until achieving the best results.

Broadly speaking, there are virtual host devices and a change in allocated temporal buffering. A decision is made regarding how many buffers are allocated for a host device, and the decision results in the change which is why virtual host devices 1 and 3 have a minus sign in Table I and virtual host devices 1 and 2 have minus signs in Table II. In general, it is to be understood that there does not always have to be an allocation change. It could be buffers that were properly allocated in this time slot for each virtual host.

To determine the performance of the allocation, the controller determines the gain. In FIG. 3, for virtual host 0, the gain in performance is 10 MB/sec. Thus, there is better performance just because of the allocation. From time to time, in this example one second, there is a check of the overall results and a decision of whether to change the allocation occurs. For example, if the gain for virtual host 1 is not sufficiently great, it may be better to not allocate more buffers to virtual host 1 because maybe it would be better to allocate the buffers to other purposes such as virtual host 0 because the gain would be higher. As shown, the process repeats over and over again until we get the best results in the system.

Circling back to Table I, by adding three temporary buffers to virtual host 0, the performance increases by 10 MB/sec. By removing three temporary buffers from virtual host 1, the performance increased by 1 MB/sec. Thus, by performing a simple reallocation of temporary buffers, overall performance of both virtual host 0 and virtual host 1 increases. The net increase for just virtual host 0 and virtual host 1 together is 11 MB/sec.

Taking a look at virtual host 2, by adding ten temporary buffers, the performance increases by only 1 MB/sec. By removing ten temporary buffers from virtual host 3, the performance decreased by 30 MB/sec. Thus, the reallocation of temporary buffers for virtual host 2 and virtual host 3 improves the performance of virtual host 2, but decreases the performance of virtual host 3. There is a net decrease for virtual host 2 and virtual host 3 together of 29 MB/sec.

Collectively, for virtual hosts 0-3, the reallocation results in a change from 450 MB/sec to 432 MB/sec, which is a net decrease in performance across the four virtual hosts. Hence, the change in allocation was not overall beneficial although there is a benefit to three of the virtual hosts (i.e., virtual hosts 0-2). As such, the allocation of temporary buffers will likely be adjusted by the controller.

As appears at FIG. 3, one implementation embodiment could include a "performance changes vs. buffers-allocation tracking table" which would track the performance change between adjacent checkpoints. The performance change will be compared to the change in the allocated temporary buffers done at the last checkpoint (and optionally also compared to the overall current number of allocated buffers).

The decision rule about the updated temporary buffers allocated to each host/system element could, for example, be based on comparison to a predefined threshold. For example, if the benefit or the gain is more than 5%, this is something to invest more in because it may be considered a high gain and thus the controller should continue allocating more and more buffer to the specific virtual function. However, if the gain is less than that, maybe it's better to not allocate for this specific virtual function and instead allocating the buffers to another virtual function. A highly simplified demonstration of such decision rule could schematically be as follows.

In case the last change in number of allocate buffers >0, and performance change >5%→allocate more buffers; in case the last change in number of allocate buffers >0, and performance change <5%→reduce number of buffers allocated at last checkpoint; in case the last change in number of allocate buffers <0, and performance change degradation is more than 5%→re-allocate the buffers reduced at the last checkpoint; in case the last change in number of allocate buffers <0, and performance change degradation is less than 5%→reduce number of allocated buffers. Of course, the actual decision rule should include balancing of the allocated buffers between the different hosts/system elements.

The checkpoint timing is set either in fixed time differences or else according to other counters such as program-erase cycles (PEC). There is also an option to initiate such checkpoint at which the buffers allocation is refreshed according to indication of system performance degradation (e.g. threshold throughput value etc.).

Example optional performance metrics are to track include read/write throughputs and latencies, power consumption etc. Such metrics can include either averaged values, and/or peak values, or a combination of several metrics.

In yet another embodiment, the buffers could be allocated for high-priority commands in order to accelerate their performance. For instance, in a QLC device, the low priority commands would use the SLC as a cache buffer while the high-priority commands utilize the reserved space of L2P implemented in DRAM and achieving higher performance.

More specifically, if there is something that should have a higher priority, such as a QLC drive that should have a high priority for write commands for a specific virtual function, there may be a desire to allocate more and more buffers for the specific application because of the priority. Because there is a high priority task, the system will also take that into account when allocating the buffers.

Figure 4:
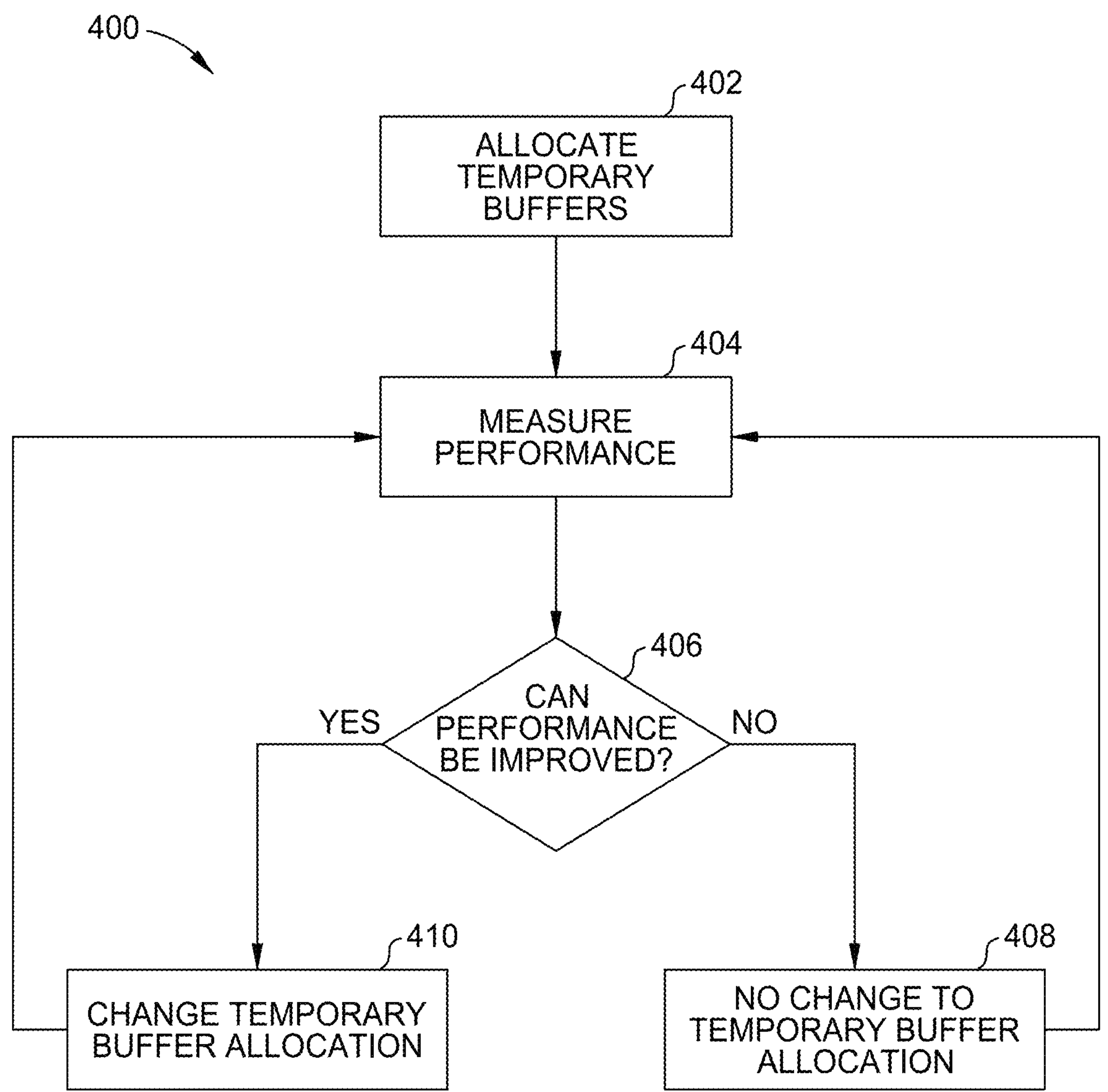
FIG. 4 is a flowchart illustrating adaptive tuning according to another embodiment.

FIG. 4 is a flowchart 400 illustrating adaptive tuning according to another embodiment. As shown in FIG. 4, initially, the temporary buffers are allocated at block 402, and the performance is measured at block 404. If the performance cannot be improved at block 406, then there is no change to the temporary buffer allocation in block 408. However, if performance can be improved at block 406, then there is a change to the temporary buffer allocation at block 410.

Figure 5:
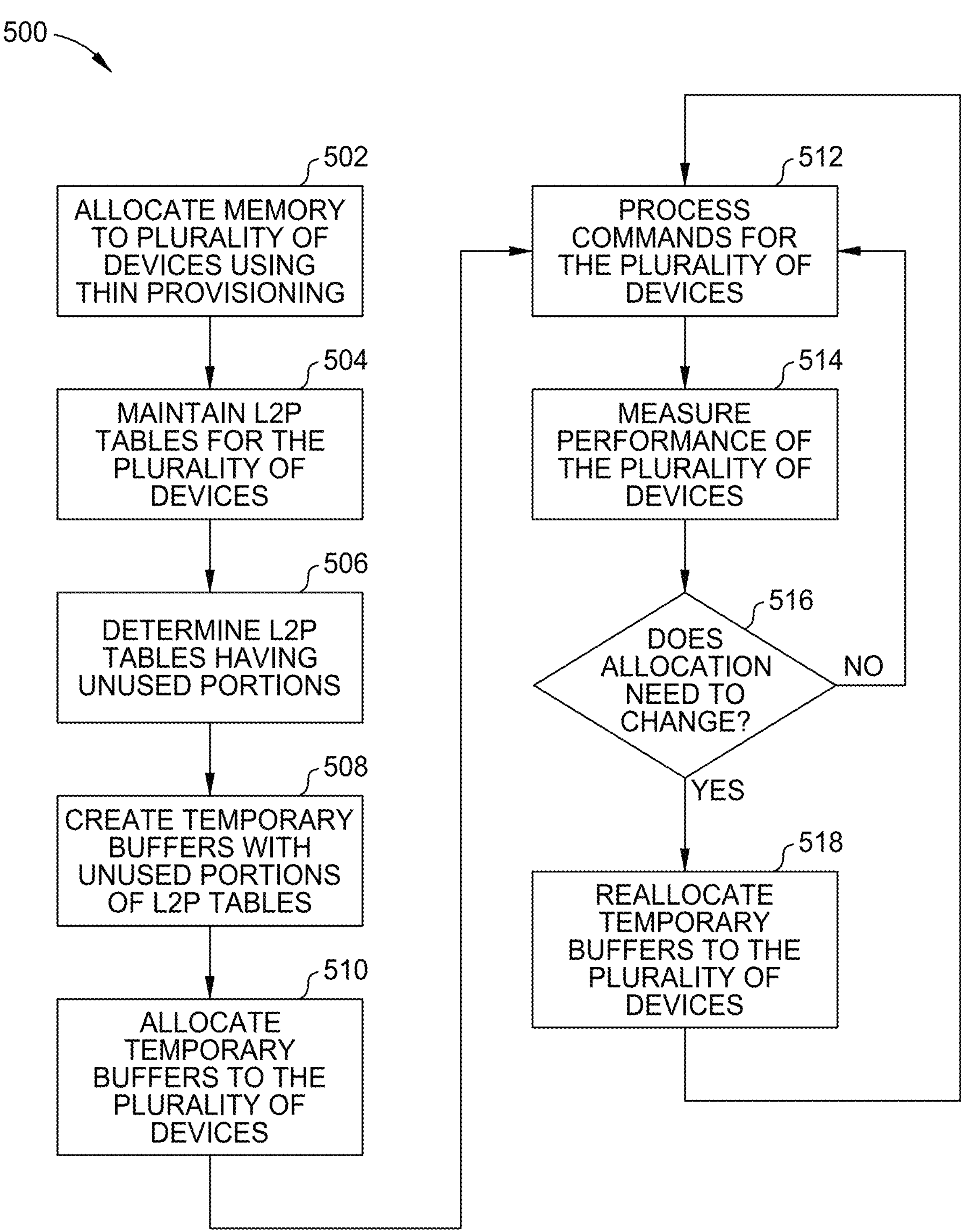
FIG. 5 is a flowchart illustrating adaptive tuning according to another embodiment.

FIG. 5 is a flowchart 500 illustrating adaptive tuning according to another embodiment. Initially, memory is allocated to a plurality of devices, such as host devices that are physical, virtual, or combinations thereof, using thin provisioning at block 502. L2P tables are maintained for the devices at block 504. Any device of the plurality of devices that is not utilizing the entirety of the memory will have some unused portion of the L2P table maintained for the particular device. Hence, if there are at least two devices, there will be at least some unused portion in at least one L2P table. Thus, the controller determines at block 506 where the unused portions are and creates temporary buffers at block 508 with the unused portions of the L2P tables. The temporary buffers at allocated at block 510 to the plurality of devices, and commands can be processed at block 512. The performance of the devices is measured at block 514. If the allocation of the temporary buffers should change at block 516, then the temporary buffers are reallocated at block 518 and commands are then continued to be processed at block 512. If, however, the allocation of the temporary buffer should not change, then commands are continued to be processed at block 512.

Optimized utilization of the L2P resources is obtained by a dynamic and adaptive splitting of the temporal buffers according to indications of optimized system performance (e.g. read/write throughput, latencies, power consumption, etc.).

In one embodiment, a data storage device comprises: a memory device; and a controller coupled to the memory device, wherein the controller is configured to: receive a write command; track and update performance values for each host device of a plurality of host devices in a table; determine whether to change buffer allocation for any host device of the plurality of host devices; and update the table tracking performance values. The performance values are selected from the group consisting of power consumption, read timing, write timing, read throughput, write throughput, latency, and combinations thereof. The controller is configured to perform thin provisioning. The controller is configured to dynamically change the buffer allocation for the plurality of host devices. The controller is configured to increase a first number of temporary buffers allocated to a first host device of the plurality of host devices, and wherein the controller is configured to decrease a second number of temporary buffers allocated to a second host device of the plurality of host devices. The first number is equal to the second number. The controller is configured to repeat the tracking, the determining, and the updating. The determining occurs after a predetermined period of time or a counter has been exceeded. The counter is number of program erase cycles (PECs) completed. The determining is to change the buffer allocation upon a performance change surpassing a predetermined threshold.

In another embodiment, a data storage device comprises: a memory device; and a controller coupled to the memory device, wherein the controller is configured to: track performance of multiple host devices; allocate temporary buffers to the multiple host devices; determine performance for one or more host devices of the multiple host device would improve with a different allocation of temporary buffers; and reallocate temporary buffers based upon the determination. At least one host device of the multiple host devices is a virtual host device. The controller is configured to determine that the performance of the multiple host devices collectively would improve by reallocating the temporary buffers. The controller utilizes a table that tracks performance changes and buffer allocation. The controller is configure to utilize checkpoint timing to determine when to perform the determining performance. The controller is configured to utilize decision rules for performance to initiate the reallocation. The determining and reallocating are repeated.

In another embodiment, a data storage device comprises: means to store data; and a controller coupled to the means to store data, wherein the controller is configured to: allocate one or more temporary buffers for processing commands of a first priority; determine whether the allocating achieves a predetermined desired performance; and change the allocation of the one or more temporary buffers. The data storage device has a quad level cell (QLC) portion and a single level cell (SLC) portion, wherein commands having the first priority use the allocated one or more temporary buffers, wherein commands having a second priority that is less than the first priority utilize a SLC cache. The SLC cache is disposed in the means to store data and wherein the one or more temporary buffers are disposed in dynamic random access memory (DRAM).

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:

a memory device; and a controller coupled to the memory device, wherein the controller is configured to:

receive a write command;

track and update performance values for each host device of a plurality of host devices in a table;

determine whether to change buffer allocation for any host device of the plurality of host devices, wherein the determining comprises measuring to determine a gain, per host device, for how buffers are allocated, and wherein the gain is in performance values, power usage, quality of service (QoS) or latency;

update the table;

perform thin provisioning;

dynamically allocate logical to physical (L2P) temporal buffers based on the tracking; and adaptive tuning of the allocated L2P temporal buffers to different host devices of the plurality of host devices.

2. The data storage device of claim 1, wherein the performance values are selected from the group consisting of power consumption, read timing, write timing, read throughput, write throughput, latency, and combinations thereof.

3. The data storage device of claim 1, wherein the controller is configured to increase a first number of temporary buffers allocated to a first host device of the plurality of host devices, and wherein the controller is configured to decrease a second number of temporary buffers allocated to a second host device of the plurality of host devices.

4. The data storage device of claim 3, wherein the first number is equal to the second number.

5. The data storage device of claim 1, wherein the controller is configured to repeat the tracking, the determining, and the updating.

6. The data storage device of claim 1, wherein the determining occurs after a predetermined period of time or a counter has been exceeded.

7. The data storage device of claim 1, wherein the determining occurs after a counter has expired and wherein the counter is number of program erase cycles (PECs) completed.

8. The data storage device of claim 1, wherein the determining is to change the buffer allocation upon a change in performance values surpassing a predetermined threshold.

9. A data storage device, comprising:

a memory device; and a controller coupled to the memory device, wherein the controller is configured to:

track performance of multiple host devices;

allocate logical to physical (L2P) temporary buffers to the multiple host devices;

determine the performance for one or more host devices of the multiple host device would improve with a different allocation of buffers, wherein the determining the performance comprises measuring to determine a gain, per host device, for how buffers are allocated, and wherein the gain is in performance, power usage, quality of service (QoS) or latency;

perform thin provisioning;

dynamically allocate the L2P temporal buffers based on the tracking; and adaptive tuning of the allocated L2P temporal buffers to different host devices of the multiple host devices.

10. The data storage device of claim 9, wherein at least one host device o the multiple host devices is a virtual host device.

11. The data storage device of claim 9, wherein the controller is configured to determine that the performance of the multiple host devices collectively would improve by reallocating the buffers.

12. The data storage device of claim 9, wherein the controller utilizes a table that tracks performance changes and buffer allocation.

13. The data storage device of claim 9, wherein the controller is configure to utilize checkpoint timing to determine when to perform the determining performance.

14. The data storage device of claim 9, wherein the determining and reallocating are repeated.

15. A data storage device, comprising:

means to store data; and a controller coupled to the means to store data, wherein the controller is configured to:

allocate one or more logical to physical (L2P) temporal buffers for processing commands of a first priority;

determine whether the allocating achieves a predetermined desired performance, wherein the determining comprises measuring to determine a gain, per host device, for how buffers are allocated, and wherein the gain is in performance power usage, quality of service (QoS) or latency;

dynamically allocate the L2P temporal buffers based on the determining; and adaptive tuning of the allocated L2P temporal buffers to different host devices of a plurality of host devices.

16. The data storage device of claim 15, wherein the data storage device has a quad level cell (QLC) portion and a single level cell (SLC) portion, wherein commands having the first priority use the allocated one or more temporary buffers, wherein commands having a second priority that is less than the first priority utilize a SLC cache.

17. The data storage device of claim 16, wherein the SLC cache is disposed in the means to store data and wherein the one or more temporary buffers are disposed in dynamic random access memory (DRAM).

* * * * *